United States Patent [19]

Dangschat

[11] 4,278,031
[45] Jul. 14, 1981

[54] PRECISION ADJUSTABLE TABLE

[75] Inventor: Holmer Dangschat, Traunwalchen, Fed. Rep. of Germany

[73] Assignee: Dr. Johannes Heidenhain GmbH, Traunreut, Fed. Rep. of Germany

[21] Appl. No.: 22,780

[22] Filed: Mar. 22, 1979

[30] Foreign Application Priority Data

Mar. 29, 1978 [DE] Fed. Rep. of Germany ....... 2813407

[51] Int. Cl.³ .............................................. A47F 5/12
[52] U.S. Cl. ...................................... 108/4; 108/147; 248/180; 248/188.4
[58] Field of Search ....................... 108/4, 7, 147, 144; 248/157, 422, 178, 180, 188.4, 188.2, 179, 396

[56] References Cited

U.S. PATENT DOCUMENTS

| 2,440,211 | 4/1948 | Rothweiler | 248/180 |
| 2,461,190 | 2/1949 | Wolff, Jr. | 248/180 |
| 3,517,904 | 6/1970 | Verchain | 248/179 X |
| 3,931,947 | 1/1976 | Tagnon | 248/180 |

FOREIGN PATENT DOCUMENTS

| 2248535 | 4/1974 | Fed. Rep. of Germany . | |
| 2543564 | 4/1977 | Fed. Rep. of Germany . | |
| 14912 | 7/1902 | United Kingdom | 248/180 |
| 152069 | 12/1961 | U.S.S.R. | 248/180 |

Primary Examiner—William E. Lyddane
Attorney, Agent, or Firm—Hume, Clement, Brinks, Willian & Olds, Ltd.

[57] ABSTRACT

An adjustable table is described having three support structures arranged symmetrically around the perimeter of the table. Each support structure is supported on a base by means of a two dimensional joint, such as a leaf spring, having an axis of rotation tangential to a circle centered at a central point of the table. Each support structure supports the table by means of a three dimensional joint such as a ball in socket joint. Each support structure includes a threaded spindle and a rotatable threaded bolt for adjusting the separation between the table and the base.

19 Claims, 8 Drawing Figures

PRECISION ADJUSTABLE TABLE

BACKGROUND OF THE INVENTION

The present invention relates to an adjustable table which is tiltably positioned by adjusting elements over a fixed base, and particularly to an adjustable table for use with precision measuring devices.

It is a known practice from West German DE-AS No. 2,515,828, to support an adjustable table of the above-mentioned type by means of three spheres arranged to bear on a fixed base in a conical depression, a prismatic groove and a plane surface, respectively. By adjusting the last two spheres, which lie on oblique prisms of the adjustable table, the table can be swung in two vertical planes perpendicular to one another about the sphere arranged in the conical depression. This arrangement presents the disadvantage that the three support points differ in rigidity, that thermal expansion can cause decentering of the table, and that the point contacts between the balls and the prismatic groove and the plane surface are susceptible to wear and deformation.

When three spheres are mounted on the fixed base and are positioned in three prisms running radially with respect to the center of the adjustable table, substantially no decentering of the table results from temperature changes, but in this case friction at the resting points must be overcome. This friction may generate forces in the table which can affect its levelness. Furthermore, wear occurs at the point contacts between the spheres and the prisms, and this wear is increased when the table is adjusted by a grinding of the spheres into the prism surfaces, so that the spheres are no longer freely shiftable in the prisms and for that reason a statically determined rest position is no longer provided.

In West German DE-AS No. 2,248,535 there is described an adjustable table that includes three plates lying one upon another, which are slidable in the horizontal plane by means of spheres placed in prismatic guides via adjusting elements, and in the vertical plane are tiltably borne by means of further spheres which bear on plane surfaces and on slopes. This arrangement is also subject to wear at the point contacts between the spheres and the plane surfaces and the prisms.

From West German DE-OS No. 2,543,564 one learns of a table that is tiltably supported on a rigid intermediate body by means of obliquely disposed bearing elements, wherein the intermediate body is horizontally shiftable by means of roller bodies with respect to a base. In West German DE-OS No. 1,772,599 there is shown an adjusting arrangement having a row of plates disposed one over another. In each case two plate surfaces lying opposite one another are designed for straight-line flat horizontal displacement and, in each case, two oppositely lying surfaces are provided with a construction for swinging about a horizontal axis. These two arrangements present the disadvantage that the adjustable surface is decentered by the swinging movement, so that a subsequent centering must be performed.

SUMMARY OF THE INVENTION

The present invention is directed to an adjustable table that substantially avoids the aforementioned disadvantages of the prior art. According to this invention, three similar adjusting structures are positioned on the periphery of an adjustable table symmetrically with respect to a central point of the table. Each of these adjusting structures is connected between the fixed base and the adjustable table by means of a two dimensional joint at one end having a tangential axis of rotation, and by means of a three dimensional joint at the other end. In this connection, the terms two dimensional and three dimensional are used to denote joints which permit relative movement in two and three dimensions, respectively.

One important advantage provided by this invention is that this adjustable table undergoes substantially no decentering during changes of temperature or adjustment. Further advantages are that the adjusting structures of this invention are not subject to point contact wear and that they permit reproducible positioning of the table with a statically determined rest position and high rigidity.

One preferred embodiment of the invention includes a leaf spring mounted in the base plate of the adjusting structure, which spring is also firmly mounted to the fixed base and is aligned tangentially to a circle centered at the central point of the table.

A second preferred embodiment includes a pair of spheres mounted in the base plate of the adjusting structure so as to fit into corresponding tangentially aligned conical recesses in the base.

In yet another preferred embodiment of this invention the adjusting structure contacts the fixed base by means of a cylindrical pin which is mounted in the base plate of the adjusting structure and fits into a tangentially aligned prismatic recess formed in the fixed base.

The invention itself, together with further objects and attendant advantages, will be best understood by reference to the following description taken in connection with the accompanying drawings.

BRIEF DESCRIPTION OF THE DRAWINGS

FIG. 1b is a top view of the table of FIG. 1a.

FIG. 1a is a cross-sectional view of an adjusting structure of the table of FIG. 1a taken along a radius of the table.

FIG. 2b is a cross-sectional view taken along line 2b—2b of FIG. 2a.

FIG. 3b is a cross-sectional view taken along line 3b—3b of FIG. 3a.

FIG. 4b is a cross-sectional view taken along 4b—4b of FIG. 4a.

DETAILED DESCRIPTION OF PREFERRED EMBODIMENTS

Figure 1A:
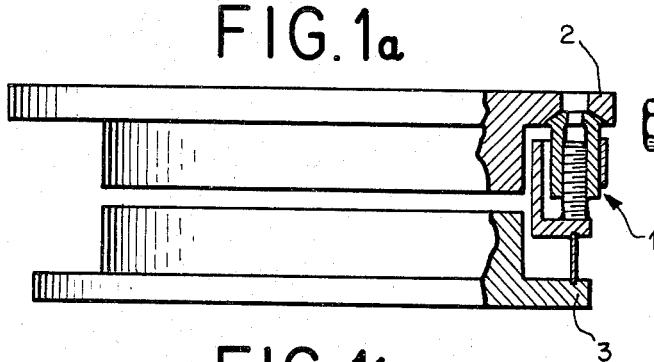
FIG. 1a is a cross-sectional view taken through the center of a first preferred embodiment of the adjustable table of this invention.
Figure 2A:
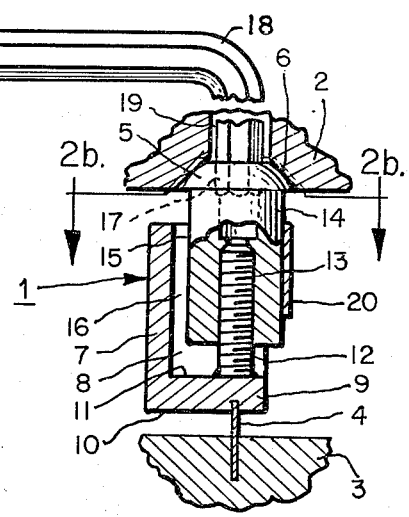
Figure 1B:
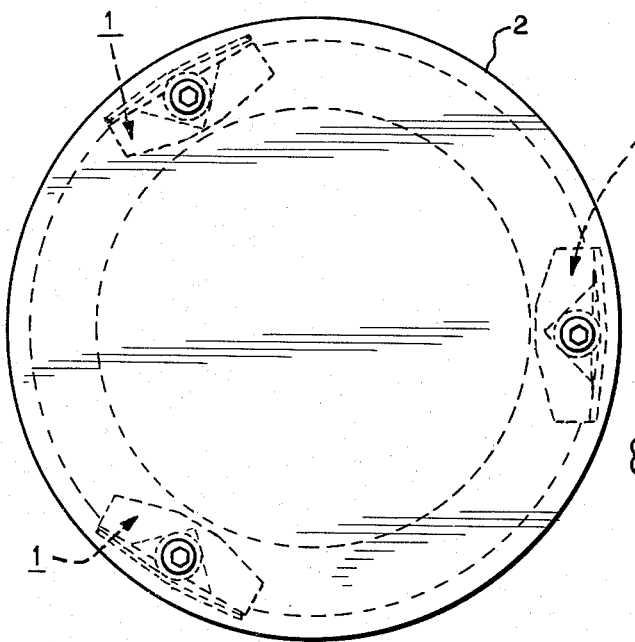
Figure 2B:
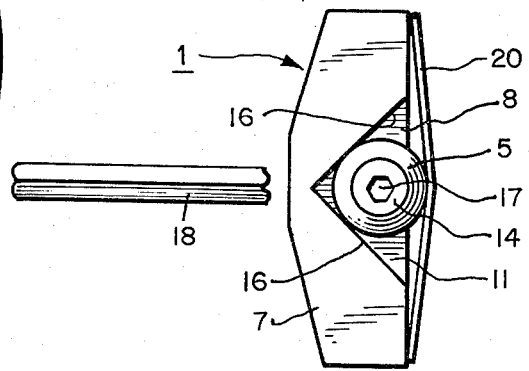

Referring now to the drawings, FIGS. 1a and 1b show an adjustable table 2 embodying the present invention. The table 2 includes three similar adjusting structures 1 mounted on the periphery of the table in rotationally symmetric positions. As shown in FIGS. 2a and 2b, in which only a single adjusting structure 1 is represented, these three adjusting structures 1 are each connected to a fixed base 3 by means of a tangentially arranged leaf spring 4 which acts as a two dimensional joint having an axis of rotation tangential to a circle centered at the center of the table 2. Each adjusting structure is mounted to the adjustable table 2 by means of a three dimensional joint 5,6 formed by a convex spherical surface 5, which fits into a correspondingly shaped concave recess 6 in the adjustable table 2.

The adjusting structure 1 includes a carrier body 7 in which is formed a centrally arranged prismatic groove 8, which is bounded by a base plate 9. On the outer surface 10 of this base plate 9 the leaf spring 4 is mounted parallel to the prismatic groove 8. The spring 4 is aligned in the tangential direction and is firmly mounted to the fixed base 3. On the inner surface 11 of the base plate 9 there is mounted a threaded spindle 12 which is aligned parallel to the prismatic groove 8. This spindle 12 engages a corresponding threaded bore 13 of a cylindrical setting bolt 14, the outer surface 15 of which is held tangent to the surfaces 16 of the prismatic groove 8 without play, and the free end of which is provided with the convex surface 5, which engages into the corresponding shaped concave recess 6 of the adjustable table 2.

A hexagonally shaped recess 17 is provided in the convex surface 5 of the setting bolt 14 for the adjustment of the adjustable table 2. This recess 17 is sized to accept an adjusting hexagonal wrench (or key) 18, which engages the recess 17 through an opening 19 formed in the adjustable table 2.

To provide improved centering and to increase the rigidity of the setting bolt 14, the outer surface 15 of the setting bolt 14 is pressed by means of a second leaf spring 20 onto the surfaces 16 of the prismatic groove 8.

Figure 3A:
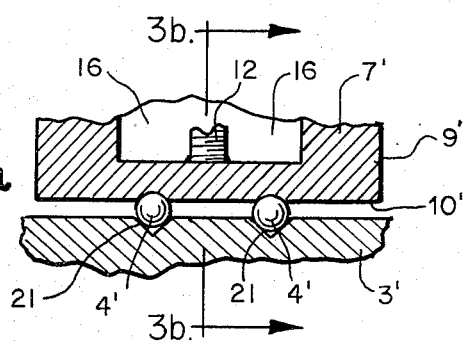
FIG. 3a is a cross-sectional view of a portion of a second preferred embodiment of the adjusting structure of this invention.
Figure 3B:
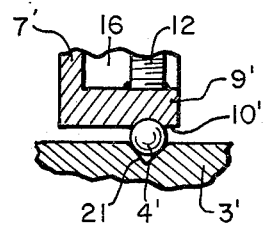

FIGS. 3a and 3b represent two partial views of a second preferred embodiment of the invention, in which two spherical elements 4' are secured in the outer surface 10' of the base plate 9' of the carrier body 7'. These spherical elements 4' fit into corresponding conical recesses 21, which are arranged along the tangential direction in the fixed base 3' and which cooperate with the spherical elements 4' to form a two dimensional joint having a tangential axis of rotation.

Figure 4A:
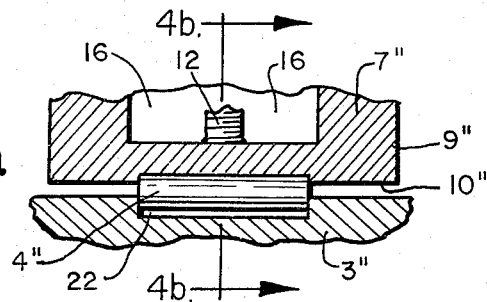
FIG. 4a is a cross-sectional view of a third preferred embodiment of the adjusting structure of this invention.
Figure 4B:
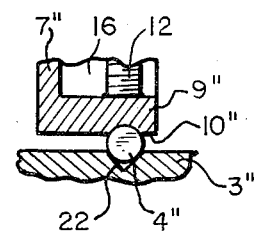

A third preferred embodiment of a two dimensional joint having a tangential axis of rotation is shown in FIGS. 4a and 4b, in which a cylindrical pin 4" is secured in the outer surface 10" of the base plate 9" of the carrier body 7". This pin 4" fits into a corresponding prismatic recess 22, which is arranged along the tangential direction in the fixed base 3".

The adjustable table of this invention eliminates the need for point contacts and provides high rigidity, low surface pressure and low wear. Neither temperature changes nor adjustment results in decentering of the adjustable table 2. Furthermore, a reproducible positioning of the table 2 with a statically determined rest position is ensured, since substantially no plastic deformation occurs at contact points.

Of course, it should be understood that various changes and modifications to the preferred embodiments described herein will be apparent to those skilled in the art. For example, the three adjusting structures can be mounted between the table and the base with a two dimensional joint having a tangential axis of rotation between the adjusting structure and the table and a three dimensional joint between the adjusting structure and the base. Such changes and modifications can be made without departing from the spirit and the scope of the present invention, and without diminishing its attendant advantages. It is, therefore, intended that such changes and modifications be covered by the following claims.

I claim:

1. A support apparatus for adjustably mounting a tiltable table to a base, said apparatus comprising:
   first, second and third support structures arranged symmetrically about a central point of the table, each support structure mounted between a surface on the table and a surface on the base, wherein each support structure includes an adjusting structure comprising:
   a carrier body having a centrally positioned prismatic groove;
   a setting bolt;
   means for mounting the bolt in the groove such that the bolt is adjustable along the axis of the groove; and
   means included in the mounting means, for retaining the bolt in the groove substantially without play; each support structure further including a two dimensional joint having an axis of rotation substantially tangential to a circle centered at the central point and mounted between the adjusting structure and one surface, and a three dimensional joint mounted between the adjusting structure and the other surface.

2. The support apparatus of claim 1 wherein each three dimensional joint comprises:
   a convex surface defined by the respective setting bolt; and
   means for defining a concave recess in the other surface, which surface is adjacent the respective setting bolt, each recess sized to receive the concave surface of the respective setting bolt.

3. The support apparatus of claim 1 or 2 wherein each carrier body defines a base plate at one end of the groove, said base plate having an outer surface on which is mounted the associated two dimensional joint and an inner surface on which is mounted a threaded spindle which extends substantially parallel to the groove, and further wherein the setting bolt defines a threaded bore which engages the spindle.

4. The support apparatus of claims 1 or 2 wherein each two dimensional joint comprises:
   a leaf spring mounted between the base and the carrier body of the respective adjusting structure, each of the leaf springs oriented substantially tangentially to a circle centered at the central point.

5. The support apparatus of claim 1 or 2 wherein each two dimensional joint comprises:
   a pair of convex elements mounted to the carrier body of the respective adjusting structure and a corresponding pair of conical recess formed in the base to receive each pair of convex elements, each of said pairs of recesses oriented substantially tangentially to a circle centered at the central point.

6. The support apparatus of claim 1 or 2 wherein each two dimensional joint comprises:
   a cylindrical pin mounted to the carrier body of the respective adjusting structure and a corresponding prismatic recess formed in the base to receive each pin, each of said recesses oriented substantially tangentially to a circle centered at the central point.

7. The support apparatus of claim 1 or 2 wherein each setting bolt defines an inset surface for receiving an adjusting wrench.

8. The support apparatus of claim 1 or 2 wherein the retaining means includes a spring strip mounted on the carrier body to hold the bolt in the groove.

9. A support apparatus for adjustably mounting a tiltable table to a base, said apparatus comprising: three support structures arranged symmetrically about a central point of the table, each support structure mounted between a surface on the table and a surface on the base, wherein each support structure includes:
   an adjusting structure which has:
      a carrier body having a triangular prismatic groove along its length,
      a base plate secured to the carrier body to terminate the prismatic groove at one end,
      a threaded spindle mounted to the base plate such that it extends within and substantially parallel to the prismatic groove,
      a setting bolt having a threaded bore sized to receive the threaded spindle such that the setting bolt is mounted to the threaded spindle and the position of the setting bolt is adjustable with respect to the carrier body along the axis of the groove;
   a first joint connecting the base plate of the carrier body to the surface on the base, the first joint having one degree of rotational freedom oriented in the plane which passes through the first joint and the central point and is perpendicular to the surface of the base; and
   a second joint connecting the setting bolt of the carrier body to the surface of the table, the second joint having three degrees of rotational freedom.

10. The apparatus of claim 9 further comprising:
    a spring strip mounted upon the carrier body to bridge the prismatic groove, such that the spring strip contacts the setting bolt to force the setting bolt into contact with the sides of the carrier body that define the prismatic groove.

11. The apparatus of claim 9 wherein each first joint has only one degree of rotational freedom and no other degree of freedom and each second joint has three degrees of rotational freedom and no other degree of freedom.

12. The apparatus of claim 9 wherein each second joint comprises:
    a convex surface, defined by the setting bolt; and
    a recessed surface formed in the surface of the table, the recessed surface slidingly engaging a portion of the convex surface.

13. The apparatus of claim 12 wherein the table defines three openings extending therethrough, each opening extending from an upper surface of the table to one of the three recessed surfaces, and further, wherein the convex surface of each setting bolt defines a socket centered on the axis of symmetry of the bolt, each socket shaped to receive and engage an adjusting tool inserted into the socket through the corresponding opening in the table.

14. The apparatus of claim 9 wherein each first joint comprises:
    a leaf spring positioned substantially perpendicular to the surface of the base and tangent to a circle centered at the central point;
    means for rigidly mounting a first end section of the leaf spring to the surface of the base; and
    means for rigidly mounting a second end section of the leaf spring to the base plate of the respective adjusting structure.

15. The apparatus of claim 9 wherein each first joint comprises:
    two convex elements attached to the base plate of the respective adjusting structure; and
    two recesses formed in the surface of the base along a line tangent at the first joint to a circle which is centered on the central point, the two recesses positioned to slidingly engage the two convex elements.

16. The apparatus of claim 9 wherein each first joint comprises:
    a cylindrical element attached to the base plate of the respective adjusting structure; and
    a prismatic recess formed in the surface of the base along a line at the first joint tangent to a circle which is centered at the central point, the recess positioned to slidingly engage the cylindrical element.

17. In an improved support apparatus for adjustably mounting a tiltable table to a base, the apparatus having three support structures arranged symmetrically about a central point of the table, each support structure mounted between a surface on the table and a surface on the base, wherein each support structure includes an adjusting structure, the improvement comprising:
    a leaf spring associated with each support structure, each leaf spring positioned substantially perpendicular to one of the surfaces and tangent to a circle centered at the central point;
    means for rigidly mounting a first end section of each leaf spring to said one surface;
    means for rigidly mounting a second end section of each leaf spring to the respective adjusting structure; and
    a joint mounted between each adjusting structure and the other of the surfaces, each joint having three degrees of rotational freedom.

18. In an improved support apparatus for adjustably mounting a tiltable table to a base, the apparatus having three support structures arranged symmetrically about a central point of the table, each support structure mounted between a surface on the table and a surface on the base, wherein each support structure includes an adjusting structure, the improvement comprising:
    two convex elements included in each support structure, the convex elements mounted to an end of each adjusting structure;
    a pair of recesses formed in one of the surfaces at each support structure along a line tangent at the support structure to a circle which is centered at the central point, each pair of recesses sized to receive and slidingly engage the two convex elements of the corresponding support structure; and
    a joint mounted between each adjusting structure and the other of the surfaces, each joint having three degrees of rotational freedom.

19. In an improved support apparatus for adjustably mounting a tiltable table to a base, the apparatus having three support structures arranged symmetrically about a central point of the table, each support structure mounted between a surface on the table and a surface on the base, wherein each support structure includes an adjusting structure, the improvement comprising:
    a cylindrical element included in each support structure, the cylindrical element mounted to an end of each adjusting structure;
    a prismatic recess formed in one of the surfaces at each support structure along a line tangent at the support structure to a circle which is centered at the central point, each recess sized to receive and slidingly engage the cylindrical element of the corresponding support structure; and
a joint mounted between each adjusting structure and the other of the surfaces, each joint having three degrees of rotational freedom.

* * * * *

UNITED STATES PATENT AND TRADEMARK OFFICE
CERTIFICATE OF CORRECTION

PATENT NO. : 4,278,031
DATED : July 14, 1981
INVENTOR(S) : Holmer Dangschat

It is certified that error appears in the above—identified patent and that said Letters Patent is hereby corrected as shown below:

Column 2, line 42, delete "FIG. 1a" and insert therefor --FIG. 2a--.

Signed and Sealed this

Twentieth Day of October 1981

[SEAL]

Attest:

GERALD J. MOSSINGHOFF

Attesting Officer　　Commissioner of Patents and Trademarks